US012690074B2

(12) United States Patent　　　　　　(10) Patent No.: US 12,690,074 B2

Muñoz De La Torre Alonso et al.　　　(45) Date of Patent: Jul. 21, 2026

(54) PFCP EXTENSION FOR RESPONDING TO USER PLANE REQUESTS

(71) Applicant: Telefonaktiebolaget LM Ericsson (publ), Stockholm (SE)

(72) Inventors: Miguel Angel Muñoz De La Torre Alonso, Madrid (ES); Miguel Angel Puente Pestaña, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 227 days.

(21) Appl. No.: 18/277,397

(22) PCT Filed: Sep. 7, 2021

(86) PCT No.: PCT/EP2021/074572

§ 371 (c)(1),
(2) Date: Aug. 16, 2023

(87) PCT Pub. No.: WO2022/174940

PCT Pub. Date: Aug. 25, 2022

(65) Prior Publication Data

US 2024/0276562 A1　　Aug. 15, 2024

(30) Foreign Application Priority Data

Feb. 17, 2021　(EP) ..................................... 21382126

(51) Int. Cl.
H04W 76/10　　　(2018.01)
H04L 61/4511　　(2022.01)
(Continued)

(52) U.S. Cl.
CPC ......... H04W 76/10 (2018.02); H04L 61/4511 (2022.05); H04L 67/02 (2013.01); H04L 67/563 (2022.05)

(58) Field of Classification Search
CPC .... H04W 76/10; H04L 61/4511; H04L 67/02; H04L 67/563; H04L 41/0894; H04L 67/565

See application file for complete search history.

(56) References Cited

U.S. PATENT DOCUMENTS

2020/0412833 A1* 12/2020 Yang ....................... H04W 4/50

OTHER PUBLICATIONS

3GenerationPartnershipProject;TechnicalSpecificationGroupCoreN etworkandTerminals;5GSystem;Session ManagementPolicyControlService;Stage3(Release17), RetrievedfromtheInternet:URL:https://ftp.3gpp.org/Specs/archive/ 29_series/29.512/29512-h10.zip29512-h10.doc[retrievedonDec. 18, 2020] (Year: 2020).*

(Continued)

*Primary Examiner* — Cheikh T Ndiaye
(74) *Attorney, Agent, or Firm* — Sage Patent Group

(57) ABSTRACT

A method performed by a first user plane entity for responding to user plane requests transmitted from a second user plane entity. The method includes transmitting from a policy control entity to a session management entity a policy rule including an indication to apply a responding action to the traffic of an application, selecting at the session management entity the user plane entity based on the support of the capability of responding to user plane requests, transmitting from the session management entity to the user plane entity a session establishment or modification request including an indication to apply a responding action to the traffic matching the application, and transmitting from the first user plane entity to the second user plane entity a response message according to the received indication to apply the responding action.

20 Claims, 8 Drawing Sheets

301. Transmit to a session management entity an association request message indicating that the user plane entity supports the capability of responding to user plane requests.

↓

302. Receive from the session management entity a session establishment or modification request including a Packet Detection Rule, PDR, and an indication to apply a responding action to the traffic matching the PDR.

↓

303. Receive from the second user plane entity a user plane request that matches the PDR.

↓

304. Transmit to the second user plane entity a response message according to the received indication to apply the responding action.

(51) Int. Cl.
    H04L 67/02           (2022.01)
    H04L 67/563        (2022.01)

(56)               References Cited

OTHER PUBLICATIONS

International Search Report and Written Opinion of the International Searching Authority, PCT/EP2021/074572, mailed Jan. 3, 2022, 15 pages.
3GPP TS 29.512 v17.1.0 (Dec. 2020); 3rd Generation Partnership Project; Technical Specification Group Core Network and Terminals; 5G System; Session Management Policy Control Service; Stage 3 (Release 17), 208 pages.
3GPP TS 29.244 v16.6.0 (Dec. 2020); 3rd Generation Partnership Project; Technical Specification Group Core Network and Terminals; Interface between the Control Plane and the User Plane Nodes; Stage 3 (Release 16), 318 pages.
3GPP TS 29.244 v16.4.0 (Jun. 2020); 3rd Generation Partnership Project; Technical Specification Group Core Network and Terminals; Interface between the Control Plane and the User Plane Nodes; Stage 3 (Release 16), 310 pages.

* cited by examiner

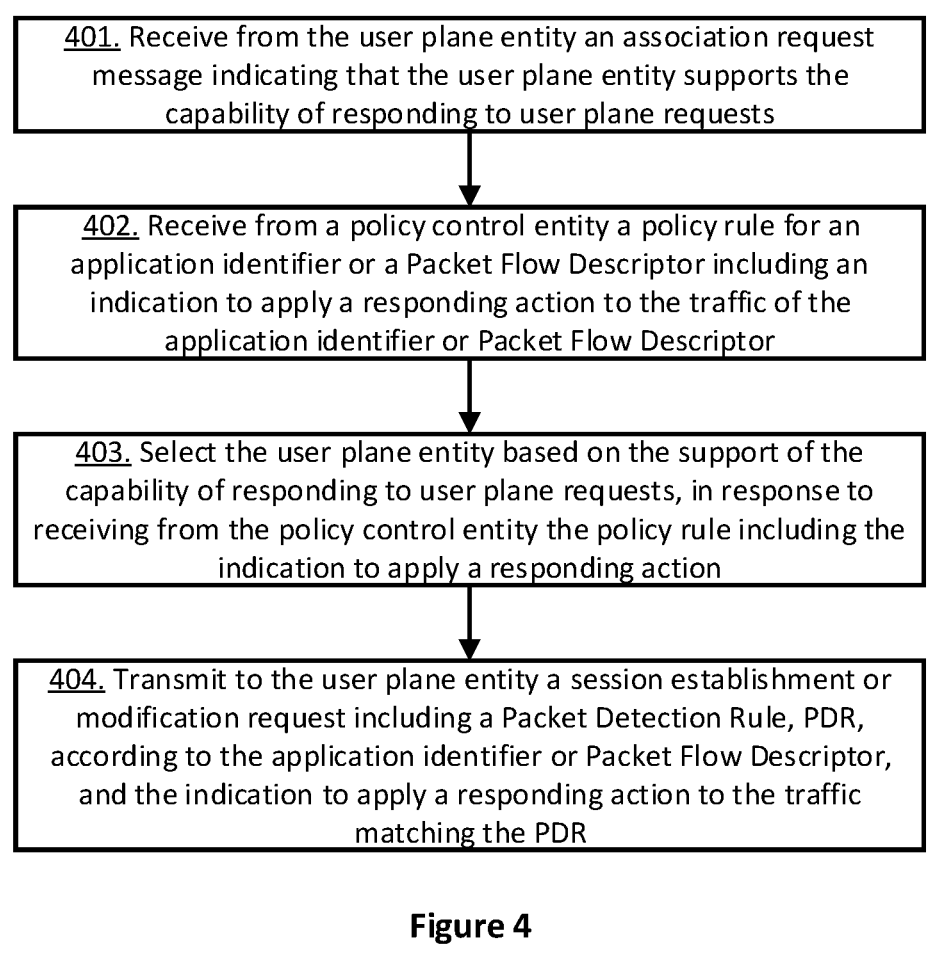

401. Receive from the user plane entity an association request message indicating that the user plane entity supports the capability of responding to user plane requests 402. Receive from a policy control entity a policy rule for an application identifier or a Packet Flow Descriptor including an indication to apply a responding action to the traffic of the application identifier or Packet Flow Descriptor 403. Select the user plane entity based on the support of the capability of responding to user plane requests, in response to receiving from the policy control entity the policy rule including the indication to apply a responding action 404. Transmit to the user plane entity a session establishment or modification request including a Packet Detection Rule, PDR, according to the application identifier or Packet Flow Descriptor, and the indication to apply a responding action to the traffic matching the PDR

Figure 4

PFCP EXTENSION FOR RESPONDING TO USER PLANE REQUESTS

CROSS REFERENCE TO RELATED APPLICATIONS

This application is a 35 U.S.C. § 371 national stage application of PCT International Application No. PCT/EP2021/074572 filed on Sep. 7, 2021, which in turn claims foreign priority to European Patent Application No. 21382126.7, filed on Feb. 17, 2021, the disclosures and content of which are incorporated by reference herein in their entirety.

TECHNICAL FIELD

The present invention generally relates to mobile or communication networks, and more specifically, the invention relates to handling user plane traffic within a mobile or communication network.

BACKGROUND

In Fifth Generation (5G) mobile networks or communication networks, the Policy Control Function (PCF) supports the unified policy framework to govern the network behaviour. The PCF provides PCC (Policy and Charging Control) rules to the Session Management Function (SMF). The SMF supports functionality such as Session Establishment, modify and release, and policy related functionalities like termination of interfaces towards Policy Control Functions, Charging data collection, support of charging interfaces and control and coordination of charging data collection at UPF. SMF receives PCC rules from PCF and configures the User Plane Function (UPF) accordingly through the N4 reference point using the so-called Packet Flow Control Protocol (PFCP).

SMF controls the packet processing in the UPF by establishing, modifying or deleting PFCP Sessions and by provisioning (i.e. adding, modifying or deleting) Packet Detection Rules (PDRs), Forwarding Action Rules (FARs), Quality Enforcement Rules (QERs) and/or Usage Reporting Rules (URRs) per PFCP session, whereby a PFCP session may correspond to an individual PDU session or a standalone PFCP session not tied to any PDU session.

Each PDR contains a Packet Detection Information (PDI) specifying the traffic filters or signatures against which incoming packets are matched. Each PDR is associated to the following rules providing the set of instructions to apply to packets matching the PDI: one FAR, which contains instructions related to the processing of the packets, specifically forward, redirect, apply header enrichment, duplicate, drop or buffer the packet with or without notifying the CP function about the arrival of a DL packet; zero, one or more QERs, which contains instructions related to the QoS enforcement of the traffic; and zero, one or more URRs, which contains instructions related to traffic measurement and reporting.

The UPF supports handling of user plane traffic based on the rules received from SMF, such as packet inspection (through PDRs) and different enforcement actions, e.g. traffic steering, QoS, Charging/Reporting (through FARs, QERs, URRs).

Some actions enforced by the UPF consist on intercepting and responding, or modifying the response, to certain user plane requests. These responding actions consist on sending a response message to the UE or Application Server in response to a previous request message from the UE or Application Server respectively. The packet or message needs to be generated in the mobile network (i.e. the UPF). As an example, DNS traffic may be intercepted at UPF to modify the DNS responses for certain purposes, for example, to redirect specific domains to specific destinations, a technique which is used in Edge Computing scenarios to route Edge applications towards the corresponding Edge Cloud and in enterprise scenarios to handle requests directed to Enterprise DNS servers (not owned by the Mobile Network Operator). Other typical responding action is HTTP traffic redirection, which can be triggered at UPF at quota exhaustion events, when blocking content or sites, etc.

A problematic aspect of these solutions is that the UPF, which is the entity intercepting and responding to the user plane request, needs to be preconfigured to execute the responding actions pertaining to specific users and applications. The UPF also needs to be preconfigured regarding what information to include in the response. This problematic aspect leads to static UPF configurations that cannot be adapted dynamically on a per user or application basis, which is slow to set up and modify.

SUMMARY

An object of the invention is to enable the dynamic configuration of responding actions in the UPF. A responding action comprises receiving at the UPF a user plane message from a user plane entity (e.g. a UE or AS), and responding from the UPF to the user plane entity with a new response message created in the UPF or by means of the modification of a response message intercepted at the UPF.

A first aspect of the invention relates to a method performed by a first user plane entity in a communications network for responding to user plane requests transmitted from a second user plane entity. The method comprises receiving from the session management entity a session establishment or modification request including a Packet Detection Rule, PDR, and an indication to apply a responding action to the traffic matching the PDR, wherein the indication comprises the network protocol to which the responding action applies to, and the information to be included in the response message; receiving from the second user plane entity a user plane request that matches the PDR; and transmitting to the second user plane entity a response message according to the received indication to apply the responding action. The method may further comprise transmitting to a session management entity an association request message indicating that the user plane entity supports the capability of responding to user plane requests.

A second aspect of the invention relates to a method performed by a session management entity in a communications network for configuring a user plane entity to respond to user plane requests transmitted from a second user plane entity. The method comprises receiving from a policy control entity a policy rule for an application identifier or a Packet Flow Descriptor including an indication to apply a responding action to the traffic of the application identifier or Packet Flow Descriptor; and transmitting to the user plane entity a session establishment or modification request including a Packet Detection Rule, PDR, according to the application identifier or Packet Flow Descriptor, and the indication to apply a responding action to the traffic matching the PDR. The method may further comprise receiving from the user plane entity an association request message indicating that the user plane entity supports the capability of responding to user plane requests; and selecting the user plane entity based on the support of the capability of responding to user plane requests, in response to receiving from the policy control entity the policy rule including the indication to apply a responding action.

A third aspect of the invention relates to a method performed by a policy control entity in a communications network for providing policies related to responding actions to user plane requests. The method comprises receiving from a session management entity a policy request for a user; determining that the user is subject to responding actions for user plane requests pertaining to an application identifier or a Packet Flow Descriptor; and transmitting to the session management entity a policy rule for the application identifier or the Packet Flow Descriptor including an indication to apply a responding action to the traffic of the application identifier or Packet Flow Descriptor. The method may further comprise retrieving from a user data repository the subscription data for the user, wherein the subscription data comprises an indication to apply a responding action to the traffic of the application identifier or the Packet Flow Descriptor.

The indicated network protocol may be Domain Name System, DNS, the response message may be a DNS response, and the information to be included in the response message may comprise any one of an address of a destination server, an address of a redirect DNS server, a redirect Fully Qualified Domain Name, an indication that the Fully Qualified Domain Name in the DNS request does not exist or an indication that no data is to be provided in the response.

The indicated network protocol may be Hypertext Transfer Protocol, HTTP, the response message may be an HTTP response, and the information to be included in the response message may comprise the HTTP response code and at least one further parameter, particularly wherein the response code is a redirect response code and the at least one further parameter comprises the redirection URL.

The indicated network protocol may be Transmission Control Protocol, TCP, the response message may be a TCP message, and the information to be included in the response message may comprise the TCP flags to be activated in the TCP header, particularly wherein the TCP flags to be activated comprise the TCP RST flag, indicating to reset the TCP connection.

The indicated network protocol may be Transport Layer Security, TLS, the response message may be a TLS message, and the information to be included in the response message may comprise the type of TLS message, particularly wherein the type of TLS message is a TLS error message to terminate the TLS handshake.

Other aspects of the invention relate to mobile network nodes, particularly a user plane entity, a session management entity and a policy control entity, each configured to perform the respective methods as described herein. Other aspects of the invention relate to computer program and computer program products.

Advantageously, the solution disclosed herein enables the MNO to trigger responding actions in a variety of scenarios. The responding actions can be triggered on a per user and application basis. Also, PFCP allows to define traffic filters (PDRs) indicating specific protocols to which the responding actions shall be triggered.

Further advantageously, the solution disclosed herein enables the MNO to control DNS resolution, specifically when the subscriber connects to an external DNS server not controller by the MNO.

Further advantageously, the solution disclosed herein enables the MNO to offer services to private network (e.g. Enterprise) subscribers.

Further advantageously, the solution disclosed herein enables the MNO to have more control on the subscriber's traffic (e.g. in case of HTTP traffic redirection, it allows the MNO to request the UE to append certain parameters in the connection towards the target endpoint).

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The invention may best be understood by referring to the following description and accompanying drawings that are used to illustrate particular embodiments of the invention.

In the drawings:

FIG. 4 is a flowchart illustrating a method performed by a mobile network node according to particular embodiments of the solution described herein.

DETAILED DESCRIPTION

The invention will now be described in detail hereinafter with reference to the accompanying drawings, in which examples of embodiments or implementations of the invention are shown. The invention may, however, be embodied or implemented in many different forms and should not be construed as limited to the embodiments set forth herein. Rather, these embodiments are provided so that this disclosure will be thorough and complete, and will fully convey the scope of present invention to those skilled in the art. It should also be noted that these embodiments are not mutually exclusive. Components from one embodiment may be tacitly assumed to be present/used in another embodiment.

These embodiments of the disclosed subject matter are presented as teaching examples and are not to be construed as limiting the scope of the disclosed subject matter. For example, certain details of the described embodiments may be modified, omitted, or expanded upon without departing from the scope of the described subject matter.

Figure 1:
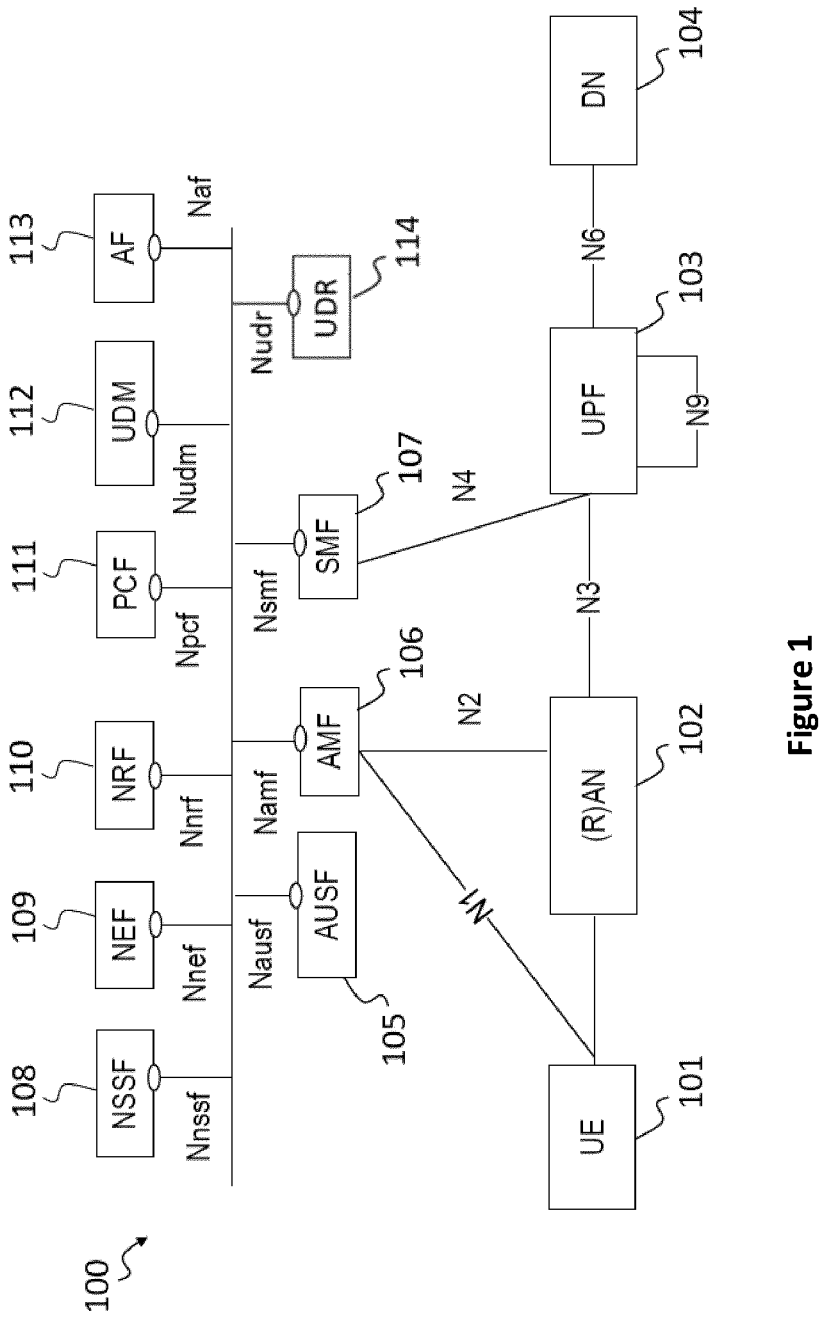
FIG. 1 is a networked system in accordance with particular embodiments of the solution described herein.

The example embodiments described herein arise in the context of a telecommunications network, including but not limited to a telecommunications network that conforms to and/or otherwise incorporates aspects of a fifth generation (5G) architecture. FIG. 1 is an example networked system 100 in accordance with example embodiments of the present disclosure. FIG. 1 specifically illustrates User Equipment (UE) 101, which may be in communication with a (Radio) Access Network (RAN) 102 and Access and Mobility Management Function (AMF) 106 and User Plane Function (UPF) 103. The AMF 106 may, in turn, be in communication with core network services including Session Management Function (SMF) 107 and Policy Control Function (PCF) 111. The core network services may also be in communication with an Application Server/Application Function (AS/AF) 113. Other networked services also include Network Slice Selection Function (NSSF) 108, Authentication Server Function (AUSF) 105, User Data Management (UDM) 112, Network Exposure Function (NEF) 109, Network Repository Function (NRF) 110, User Data Repository (UDR) 114 and Data Network (DN) 104. In some example implementations of embodiments of the present disclosure, an AMF 106, SMF 107, UPF 103, PCF 111, AUSF 105, NRF 110, UDM 112, NEF 109, AF 113, UDR 114, and NSSF 108 are each considered to be an NF. One or more additional instances of the network functions (NF) may be incorporated into the networked system.

The solution described herein aims to enable the dynamic configuration of responding actions in the UPF. A responding action comprises receiving at the UPF a user plane message from a user plane entity (e.g. a UE or AS), and responding from the UPF to the user plane entity with a new response message created in the UPF or by means of the modification of a response message intercepted at the UPF.

To achieve such object, herein it is disclosed an extension of the PFCP protocol, specifically by adding support for a new type of enforcement action which is herein referred to as responding action. The solution described herein comprises:

At operator's network, a new feature "Responding action" can be enabled/disabled on a per subscriber, on a per group of subscribers or on a per node basis. Additionally, this feature can also be enabled on a per application and/or PCC rule basis.

A PFCP parameter or Information Element (in the PFCP Association procedure) comprising the UPF capability: support of responding action, which allows SMF to select a UPF supporting this capability on a per PFCP session basis.

A PFCP parameter or Information Element in the FAR with the type of enforcement action: responding action, which can be configured by the SMF (the SMF receives the responding action from the PCF and sends it towards the UPF) on a per PFCP session basis and on a per PDR basis (at PFCP Session Establishment and PFCP Session Modification). This can be enabled by PCF both on a per subscriber and on a per PCC rule basis. The following parameters are disclosed to be included in the PCC rule (and the corresponding PDR/FAR):

Protocol: Indicates the protocol for which Responding action applies to (e.g. DNS, HTTP, TCP, TLS, etc).

Responding action/s: Indicates the specific action/s to be applied. Responding actions may be defined depending on the used protocol, and may specify messages and/or information elements to be provided. A responding action may also specify parameters that are to be included in a response message. This is configured in the enforcement part of the PCC rule (and included by SMF as extensions in the FAR). The following Responding actions may be included:

If Protocol=DNS:

A/AAAA: Indicates UPF to return the A address record (IPv4) and/or AAAA address record (IPv6) in the DNS response to indicate to the DNS client the server IP address/es corresponding to the target domain. In this case, the IP address/es need to be included:

IP Address/es: server IP address/es corresponding to the target domain.

SERVER_REDIRECT: Indicates UPF to redirect the DNS request to another DNS server. In this case, the DNS Server needs to be included:

Redirect DNS Server: DNS Server to be redirected.

CNAME: Indicates UPF to return the CNAME record in the DNS response to indicate to the DNS client to redirect to this other domain. In this case, the domain to be redirected needs to be included:

Redirect domain: domain to be redirected.

NXDOMAIN: Indicates UPF to return NXDOMAIN in the DNS response to indicate to the DNS client that the target domain does not exist.

NODATA: Indicates UPF to return NODATA in the DNS response to indicate to the DNS client that the target domain exists, but that there is no data (server IP address/es) for that domain.

If Protocol=HTTP:

Response message: Indicates UPF to generate a specific response message (e.g. 2xx for successful response, 3xx for redirection, 4xx/5xx for error response). This applies to each HTTP request method.

Parameters: Indicates UPF to include in the above response message a list of parameters (e.g. the URL to redirect to in the case of 3xx, the URL in the original request, IMSI, MSISDN, etc).

If Protocol=TCP:

Response message: Indicates UPF to generate a specific response message (e.g. TCP RST to reset the connection). This applies to each TCP SYN message received.

Parameters: Indicates UPF to include in the above response message a list of parameters (e.g. set some TCP flags in the TCP response message).

If Protocol=TLS:

Response message: Indicates UPF to generate a specific response message (e.g. TLS error message to terminate the TLS handshake). This applies to each TLS request message received from UE.

Parameters: Indicates UPF to include in the above response message a list of parameters (e.g. include a self-signed certificate in the TLS response message).

The UPF analyzes the traffic for the PFCP session and, for the traffic matching a PDR associated to a FAR with an associated responding action, performs the following:

If Protocol=DNS:

A/AAAA: In this case, UPF includes in the DNS response in the A address record (IPv4) and/or AAAA address record (IPv6), the target IP address/es for the target domain, e.g.

dns-qname xcap.ims.mnc030.mcc234.pub.3gppnetwork.org ipv4-address 10.249.78.12 ipv6-address 2A01:04C8:F400:F27C::4

The UPF returning new/modified A/AAAA records can be used as a mechanism for the MNO to control DNS resolution, e.g. to allow for MNO services in case of private network (Enterprise) subscribers or to redirect the traffic to a top-up server when the subscriber runs out of quota, this on a per PCC rule and/or on a per subscriber basis.

SERVER_REDIRECT: In this case, two alternatives may take place:

UPF forwards the DNS request message to the target DNS server (e.g. by replacing the destination IP address at IP header by the target DNS server IP address).

UPF includes in the DNS response a new record (SERVER_REDIRECT) to indicate to the DNS client to redirect to another DNS Server as a DNS extension.

Both alternatives above can be used as a mechanism for the MNO to select the DNS Server on a per PCC rule and/or on a per subscriber basis.

CNAME: In this case, UPF includes in the DNS response the CNAME record to indicate to the DNS client to redirect to another domain.

The UPF returning CNAME can be used as a mechanism for the MNO to control DNS resolution, specifically the target domain on a per PCC rule and/or on a per subscriber basis.

NXDOMAIN: In this case, UPF includes in the DNS response NXDOMAIN to indicate to the DNS client that the target domain does not exist.

NODATA: In this case, UPF includes in the DNS response NODATA to indicate to the DNS client that the target domain exists, but that there is no data (server IP address/es) for that domain.

The UPF returning NXDOMAIN and NODATA can be used as a mechanism to block traffic, avoiding the UE app client to connect to the app server.

If Protocol=HTTP:

Response message: UPF generates the requested response message (e.g. 2xx for successful response, 3xx for redirection, 4xx/5xx for error response). This applies to each HTTP request method.

Parameters: UPF includes in the above response message the requested list of parameters (e.g. the URL to redirect to in the case of 3xx, the URL in the original request, IMSI, MSISDN, etc.).

If Protocol=TCP:

Response message: UPF generates a specific response message (e.g. TCP RST to reset the connection if the subscriber has no more quota). This applies to each TCP SYN message received.

The UPF returning TCP RST can be used as a mechanism to block traffic, avoiding the UE app client to connect to the app server.

If Protocol=TLS:

Response message: UPF generates a specific response message (e.g. TLS error message to terminate the TLS handshake if the subscriber has no more quota). This applies to each TLS Client Hello message received.

The UPF returning TLS error message can be used as a mechanism to block traffic, avoiding the UE app client to connect to the app server.

The UE or AS receives the response message (generated/modified by UPF as indicated above) and performs the following:

If Protocol=DNS:

The DNS client at the UE or the AS receives the DNS Response message (generated/modified by UPF as indicated above) and gets the DNS response information. In case of receiving a DNS SERVER_REDIRECT, a DNS redirection is performed.

If Protocol=HTTP:

The HTTP client (at UE or the AS) receives the HTTP Response message (generated/modified by UPF as indicated above) and gets the HTTP response information. In the case of 3xx response message, the HTTP client triggers a connection to the requested URL and appends the parameters indicated above (e.g. URL in the original request, IMSI, MSISDN, etc).

If Protocol=TCP:

The TCP client (at UE or the AS) receives e.g. the TCP RST message (generated by UPF as indicated above) and resets the TCP connection.

If Protocol=TLS:

TLS client (at UE) receives e.g. the TLS error message (generated by UPF as indicated above) and handles the error message.

This disclosure provides a method performed by a first user plane entity, a second user plane entity, a session management entity and a policy control entity. The first user plane entity may be a UPF 103. The second user plane entity may be a UE 101 or an application server (AS) 201. The session management entity may be a SMF 107. The policy control entity may be a PCF 111.

The method comprises transmitting from the first user plane entity to the session management entity an association request message indicating that the user plane entity supports the capability of responding to user plane requests; transmitting from the session management entity to the policy control entity a policy request for a user; determining at the policy control entity that the user is subject to responding actions for user plane requests pertaining to an application identifier or a Packet Flow Descriptor; transmitting from the policy control entity to the session management entity a policy rule for the application identifier or the Packet Flow Descriptor including an indication to apply a responding action to the traffic of the application identifier or Packet Flow Descriptor; selecting at the session management entity the user plane entity based on the support of the capability of responding to user plane requests, in response to receiving from the policy control entity the policy rule including the indication to apply a responding action; transmitting from the session management entity to the user plane entity a session establishment or modification request including a Packet Detection Rule, PDR, according to the application identifier or Packet Flow Descriptor, and the indication to apply a responding action to the traffic matching the PDR; and transmitting from the first user plane entity to the second user plane entity a response message according to the received indication to apply the responding action. The method may further comprise retrieving at the policy control entity from a user data repository (e.g. UDR 114) the subscription data for the user, wherein the subscription data comprises an indication to apply a responding action to the traffic of the application identifier or the Packet Flow Descriptor.

The indicated network protocol may be Domain Name System, DNS, the response message may be a DNS response, and the information to be included in the response message may comprise any one of an address of a destination server, an address of a redirect DNS server, a redirect Fully Qualified Domain Name, an indication that the Fully Qualified Domain Name in the DNS request does not exist or an indication that no data is to be provided in the response.

The indicated network protocol may be Hypertext Transfer Protocol, HTTP, the response message may be an HTTP response, and the information to be included in the response message may comprise the HTTP response code and at least one further parameter, particularly wherein the response code is a redirect response code and the at least one further parameter comprises the redirection URL.

The indicated network protocol may be Transmission Control Protocol, TCP, the response message may be a TCP message, and the information to be included in the response message may comprise the TCP flags to be activated in the TCP header, particularly wherein the TCP flags to be activated comprise the TCP RST flag, indicating to reset the TCP connection.

The indicated network protocol may be Transport Layer Security, TLS, the response message may be a TLS message, and the information to be included in the response message may comprise the type of TLS message, particularly wherein the type of TLS message is a TLS error message to terminate the TLS handshake.

This disclosure also provides mobile network nodes, particularly a UPF 600, a SMF 700, and a PCF 800, each configured to perform the respective methods as described herein. This disclosure also provides the corresponding computer program and computer program products comprising code, for example in the form of a computer program, that when run on processing circuitry of the mobile network nodes causes the mobile network nodes to perform the disclosed methods.

Advantageously, the solution disclosed herein enables the MNO to trigger responding actions in a variety of scenarios. The responding actions can be triggered on a per user and application basis. Also, PFCP allows to define traffic filters (PDRs) indicating specific protocols to which the responding actions shall be triggered.

Further advantageously, the solution disclosed herein enables the MNO to control DNS resolution, specifically when the subscriber connects to an external DNS server not controller by the MNO.

Further advantageously, the solution disclosed herein enables the MNO to offer services to private network (e.g. Enterprise) subscribers.

Further advantageously, the solution disclosed herein enables the MNO to have more control on the subscriber's traffic (e.g. in case of HTTP traffic redirection, it allows the MNO to request the UE to append certain parameters in the connection towards the target endpoint).

Hereinafter, drawings showing examples of embodiments of the solution are described in detail.

Figure 2A:
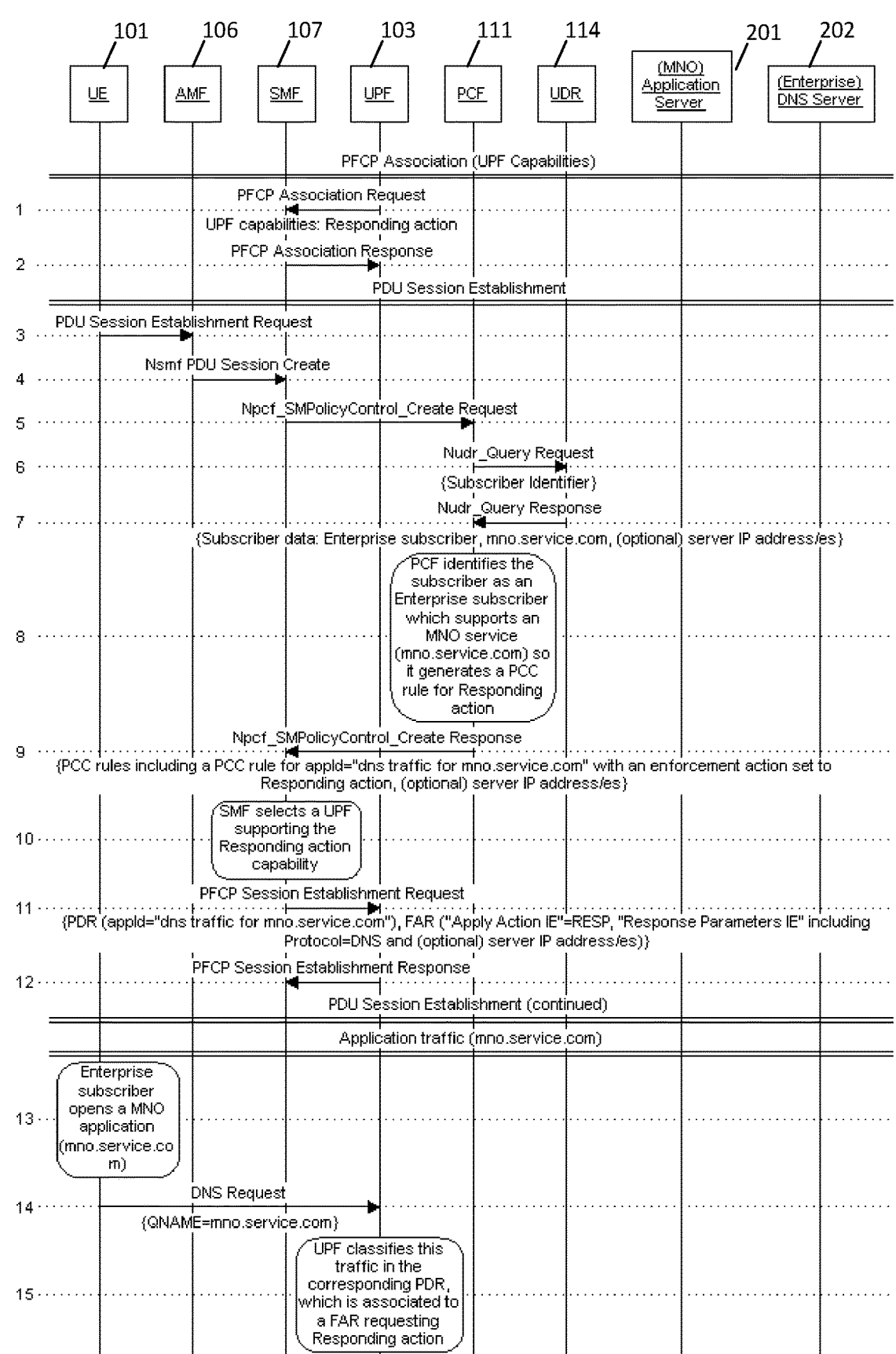
FIG. 2a and FIG. 2b is a signaling diagram illustrating a procedure according to particular embodiments of the solution described herein.
Figure 2B:
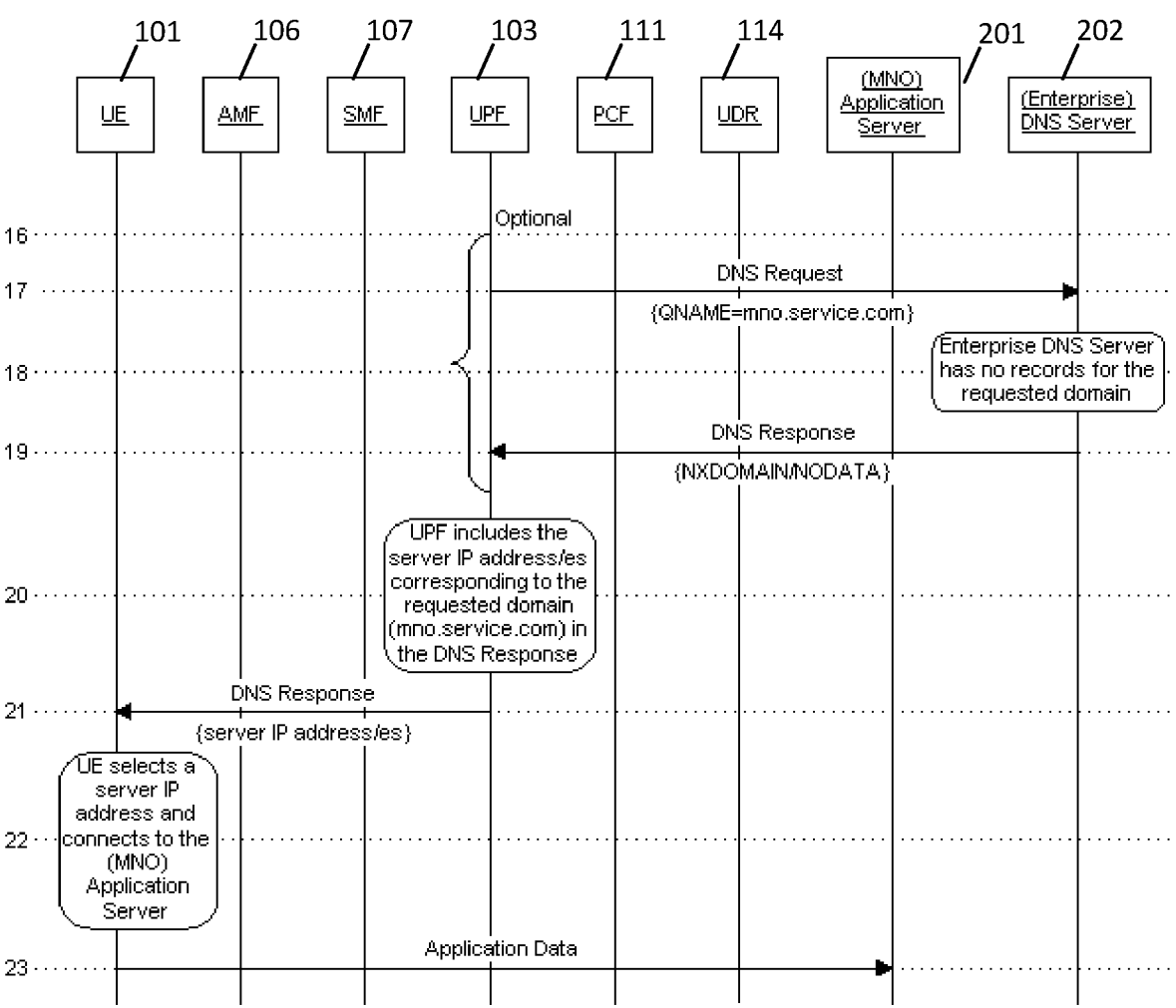

FIGS. 2a and 2b show a signaling diagram illustrating a procedure for configuring responding actions in the UPF. The procedure described in FIGS. 2a and 2b may apply to an enterprise scenario in which the user of a private network uses a service provided by the MNO, e.g. the MNO's application, an MNO's online service, etc. The procedure is performed by a UE 101, an AMF 106, a SMF 107, a UPF 103, a PCF 111, a UDR 114, an Application Server 201 and a DNS server 202. Prior to the execution of this procedure, the subscription data in the UDR for the user is configured to indicate the usage or support of the MNO service, optionally also indicating that the user is a private network (enterprise) subscriber.

Steps 1 and 2) At PFCP Association procedure between UPF and SMF entities, the UPF reports the capabilities including a Responding action: RESU capability. See table below. This allows SMF to know which UPFs support this capability and thus can influence UPF selection.

TABLE 1

UP Function Features

| Feature Octet/Bit | Feature | Interface | Description |
|---|---|---|---|
| 5/1 | BUCP | Sxa, N4 | Downlink Data Buffering in CP function is supported by the UP function. |
| 5/2 | DDND | Sxa, N4 | The buffering parameter 'Downlink Data Notification Delay' is supported by the UP function. |
| 5/3 | DLBD | Sxa, N4 | The buffering parameter 'DL Buffering Duration' is supported by the UP function. |
| 5/4 | TRST | Sxb, Sxc, N4 | Traffic Steering is supported by the UP function. |
| 5/5 | FTUP | Sxa, Sxb, N4 | F-TEID allocation/release in the UP function is supported by the UP function. |
| 5/6 | PFDM | Sxb, Sxc, N4 | The PFD Management procedure is supported by the UP function. |
| 5/7 | HEEU | Sxb, Sxc, N4 | Header Enrichment of Uplink traffic is supported by the UP function. |
| 5/8 | TREU | Sxb, Sxc, N4 | Traffic Redirection Enforcement in the UP function is supported by the UP function. |
| 6/1 | EMPU | Sxa, Sxb, N4 | Sending of End Marker packets supported by the UP function. |
| 6/2 | PDIU | Sxa, Sxb, Sxc, N4 | Support of PDI optimised signalling in UP function (see clause 5.2.1A.2). |
| 6/3 | UDBC | Sxb, Sxc, N4 | Support of UL/DL Buffering Control |
| 6/4 | QUOAC | Sxb, Sxc, N4 | The UP function supports being provisioned with the Quota Action to apply when reaching quotas. |
| 6/5 | TRACE | Sxa, Sxb, Sxc, N4 | The UP function supports Trace (see clause 5.15). |
| 6/6 | FRRT | Sxb, N4 | The UP function supports Framed Routing (see IETF RFC 2865 [37] and IETF RFC 3162 [38]). |
| 6/7 | PFDE | Sxb, N4 | The UP function supports a PFD Contents including a property with multiple values. |

TABLE 1-continued

UP Function Features

| Feature Octet/Bit | Feature | Interface | Description |
|---|---|---|---|
| 6/8 | EPFAR | Sxa, Sxb, Sxc, N4 | The UP function supports the Enhanced PFCP Association Release feature (see clause 5.18). |
| 7/1 | DPDRA | Sxb, Sxc, N4 | The UP function supports Deferred PDR Activation or Deactivation. |
| 7/2 | ADPDP | Sxa, Sxb, Sxc, N4 | The UP function supports the Activation and Deactivation of Pre-defined PDRs (see clause 5.19). |
| 7/3 | UEIP | Sxb, N4 | The UP function supports allocating UE IP addresses or prefixes (see clause 5.21). |
| 7/4 | SSET | N4 | UPF support of PFCP sessions successively controlled by different SMFs of a same SMF Set (see clause 5.22). |
| 7/5 | MNOP | Sxa, Sxb, Sxc, N4 | The UP function supports measurement of number of packets which is instructed with the flag 'Measurement of Number of Packets' in a URR. See also clause 5.2.2.2.1. |
| 7/6 | MTE | N4 | UPF supports multiple instances of Traffic Endpoint IDs in a PDI. |
| 7/7 | BUNDL | Sxa, Sxb, Sxc, N4 | PFCP messages bunding (see clause 6.5) is supported by the UP function. |
| 7/8 | GCOM | N4 | UPF support of 5G VN Group Communication. (See clause 5.23) |
| 8/1 | MPAS | N4 | UPF support for multiple PFCP associations to the SMFs in an SMF set (see clause 5.22.3). |
| 8/2 | RTTL | N4 | UPF supports redundant transmission at transport layer. |
| 8/3 | VTIME | Sxb, N4 | UP function support of quota validity time feature. |
| 8/4 | NORP | Sxa, Sxb, Sxc, N4 | UP function support of Number of Reports as specified in clause 5.2.2.2. |
| 8/5 | IPTV | N4 | UPF support of IPTV service (see clause 5.25) |
| 8/6 | IP6PL | N4 | UPF supports UE IPV6 address(es) allocation with IPV6 prefix length other than default/64 (including allocating/128 individual IPv6 addresses), as specified in clause 4.6.2.2 of of 3GPP TS 23.316 [57]. |
| 8/7 | TSCU | N4 | Time Sensitive Communication is supported by the UPF (see clause 5.26). |
| 8/8 | MPTCP | N4 | UPF support of MPTCP Proxy functionality (see clause 5.20) |
| 9/1 | ATSSS-LL | N4 | UPF support of ATSSS-LLL steering functionality (see clause 5.20) |
| 9/2 | QFQM | N4 | UPF support of per QoS flow per UE QoS monitoring (see clause 5.24.4). |
| 9/3 | GPQM | N4 | UPF support of per GTP-U Path QoS monitoring (see clause 5.24.5). |
| 9/4 | MT-EDT | Sxa | SGW-U support of reporting the size of DL Data Packets. (see clause 5.2.4.1). |
| 9/5 | CIOT | Sxb, N4 | UP function support of CIoT feature, e.g. small data packet rate enforcement. (see 5.4.15) |

TABLE 1-continued

UP Function Features

| Feature Octet/Bit | Feature | Interface | Description |
|---|---|---|---|
| 9/6 | ETHAR | N4 | UPF support of Ethernet PDU Session Anchor Relocation (see clause 5.13.6). |
| 9/7 | DDDS | N4 | UPF support of reporting the first buffered/ discarded downlink data for downlink data delivery status notification. |
| 9/8 | RDS | Sxb, N4 | UP function support of Reliable Data Service (see clause 5.29). |
| 10/1 | RTTWP | N4 | UPF support of RTT measurements towards the UE Without PMF. |
| 10/2 | RESU | Sxb, Sxc, N4 | UP function support of Responding action. |

Steps 3 and 4) The UE triggers the PDU session establishment procedure, by means of sending a PDU Session Establishment Request to the AMF. The AMF selects an SMF to manage the PDU session (the SMF selection function in the AMF selects an SMF instance based on the available SMF instances obtained from NRF or on the configured SMF information in the AMF) and triggers Nsmf PDU Session Create.

Step 5) The SMF triggers a Npcf_SMPolicyControl_Create Request message to retrieve SM policies for the user PDU session.

Step 6) The PCF triggers a Nudr_Query Request message including the subscriber identifier to retrieve the policy data for this subscriber's PDU session.

Step 7) The UDR answers with a Nudr_Query Response message including the Subscriber Data. This message may indicate if the subscriber is an Enterprise subscriber which supports an MNO service, optionally including the IP address/es of the server/s providing that MNO service.

Step 8) The PCF identifies the subscriber as an Enterprise subscriber who supports an MNO service, so it generates a PCC rule to trigger a Responding action, including the following information:

In the detection part of the PCC rule, the PCF indicates to detect DNS traffic matching the target domain. This requires an extension in the PCC rule as only 5-tuples are supported today. Alternatively, this could be done through an application identifier (appid), which means the target domain is locally configured in the UPF.

In the enforcement part of the PCC rule, the following is included:

Protocol: Indicates the protocol for which Responding action applies to (e.g. DNS, HTTP, TLS, etc). In the example embodiment shown in the figure, the protocol is DNS.

The type of enforcement: Responding action. Different Responding actions may be included for DNS protocol:

A/AAAA: Indicates the UPF to return A address record (IPv4) and/or AAAA address record (IPv6) in the DNS response to indicate to the DNS client the server IP address/es corresponding to the target domain. Optionally, the IP address/es are included as part of the PCC rule:

P Address/es: server IP address/es corresponding to the target domain.

SERVER_REDIRECT: Indicates the UPF to redirect the DNS request to another DNS server. In this case, the DNS Server needs to be included:

Redirect DNS Server: DNS Server to be redirected.

CNAME: Indicates the UPF to return CNAME record in the DNS response to indicate to the DNS client to redirect to this other domain. In this case, the domain to be redirected needs to be included:

Redirect domain: domain to be redirected.

NXDOMAIN: Indicates the UPF to return NXDO-MAIN in the DNS response to indicate to the DNS client that the target domain does not exist.

NODATA: Indicates the UPF to return NODATA in the DNS response to indicate to the DNS client that the target domain exists, but that there is no data (server IP address/es) for that domain.

Step 9) The PCF triggers a Npcf_SMPolicyControl_Create Response message including the PCC rules for the session, and specifically includes the PCC rule for the responding action.

Steps 10 and 11) The SMF selects a UPF supporting the Responding action capability and triggers the PFCP Session Establishment procedure towards the UPF to provision the PDRs (and the corresponding enforcement actions: FARs, URRs, etc) for the PDU session. The SMF provisions:

An (UL/DL) PDR to detect DNS traffic matching the target domain. This may be done through a PDI of type application identifier (appid).

An associated FAR indicating the responding actions described in Step 8. The PFCP protocol may include:

RESP bit (in bold) in "Apply Action" IE (in "Create/Update FAR" IE) to indicate UPF a new action required to apply to the packets:

"Responding Parameters" IE in the "Create/Update FAR" IE. The "Responding Parameters" IE may include Protocol=DNS and the A/AAAA action to request UPF to return A address record (IPv4) and/or AAAA address record (IP) in the DNS response to indicate to the DNS client the server P address/es corresponding to the target domain. Optionally, the P address/es are included in the "Responding Parameters" IE. An example for a Create FAR IE is shown in Table 2.

TABLE 2

| Create FAR IE within PFCP Session Establishment Request | | | | | | | |
|---|---|---|---|---|---|---|---|
| Octet 1 and 2<br>Create FAR IE Type = 3 (decimal)<br>Octets 3 and 4<br>Length = n | | | | | | | |
| Information | | | | Appl. | | | |
| elements | P | Condition/Comment | Sxa | Sxb | Sxc | N4 | IE Type |
| FAR ID | M | This IE shall uniquely identify the FAR among all the FARs configured for that PFCP session. | X | X | X | X | FAR ID |
| Apply Action | M | This IE shall indicate the action to apply to the packets, See clauses 5.2.1 and 5.2.3. | X | X | X | X | Apply Action |
| Forwarding Parameters | C | This IE shall be present when the Apply Action requests the packets to be forwarded. It may be present otherwise. When present, this IE shall contain the forwarding instructions to be applied by the UP function when the Apply Action requests the packets to be forwarded. See table 7.5.2.3-2. | X | X | X | X | Forwarding Parameters |
| Duplicating Parameters | C | This IE shall be present when the Apply Action requests the packets to be duplicated. It may be present otherwise. When present, this IE shall contain the forwarding instructions to be applied by the UP function for the traffic to be duplicated, when the Apply Action requests the packets to be duplicated. Several IEs with the same IE type may be present to represent to duplicate the packets to different destinations. See NOTE 1. See table 7.5.2.3-3. | X | X | — | — | Duplicating Parameters |
| BAR ID | O | When present, this IE shall contain the BAR ID of the BAR defining the buffering instructions to be applied by the UP function when the Apply Action requests the packets to be buffered. | X | — | — | X | BAR ID |
| Redundant Transmission Parameters | C | This IE shall be present when the Apply Action requests the packets to be duplicated for redundant transmission and the Forwarding Parameters IE is included. It may be present otherwise. When present, this IE shall contain the forwarding instructions to be applied by the UP function for the traffic to be duplicated, when the Apply Action requests the packets to be duplicated for redundant | | | | | Redundant Transmission Parameters |

TABLE 2-continued

| Create FAR IE within PFCP Session Establishment Request | | | | | | | |
|---|---|---|---|---|---|---|---|
| Octet 1 and 2<br>Create FAR IE Type = 3 (decimal)<br>Octets 3 and 4<br>Length = n | | | | | | | |
| | | | | Appl. | | | |
| Information<br>elements | P | Condition/Comment | Sxa | Sxb | Sxc | N4 | IE Type |
| | | transmission. Except for the parameters<br>included in the Redundant Transmission<br>Parameters IE, the duplicated packets shall<br>apply the same parameters as those<br>indicated in the Forwarding Parameters IE.<br>See table 7.5.2.3-4. | | | | | |
| Responding<br>Parameters | O | This IE may be present if the UP function<br>indicated support of Responding action.<br>When present, it shall contain the<br>parameters relative to Responding action. | — | X | X | X | Responding<br>Parameters |

Steps 12 to 14) After the PDU session is established, the subscriber opens an MNO application/service and the UE triggers a DNS Request towards the Enterprise DNS server including the requested domain (e.g. QNAME=mno.service.com).

Steps 14 and 15) The UPF classifies this traffic in the corresponding PDR, which is associated to a FAR requesting Responding action. In this example, the "Responding Parameters" IE in the FAR includes the A/AAAA action, and UPF applies the logic indicated in next steps.

Steps 16 to 19) Optionally, the UPF forwards the original DNS Request message to the DNS server. In this example, as the DNS Server has no records for the requested domain, which is a private domain for the MNO, it replies with a DNS Response message including NXDOMAIN or NODATA.

Steps 20 and 21) The UPF includes the server IP address/es corresponding to the requested domain in the DNS Response message. Two alternatives may take place:

In case the UPF previously forwarded the original DNS Request message to the DNS server, the UPF waits for the DNS Response message and it removes the NXDO-MAIN/NODATA (when present) and inserts/replaces the A/AAAA records by including the server IP address/es corresponding to the requested domain.

In case the UPF did not forward the original DNS Request message to the DNS server, the UPF generates a DNS Response message with the A/AAAA records including the server IP address/es corresponding to the requested domain. In this case, the UPF may include a DNS Server SF to apply the logic indicated above.

Steps 22 and 23) The UE receives the DNS Response message, selects a server IP address, and connects to the Application Server.

In case the protocol is a different protocol than DNS, e.g. HTTP, TCP or TLS, the procedure applies mutatis mutandis by including the corresponding parameters described herein for each protocol in the corresponding messages.

The solution described herein does not only apply to 5G network architecture, but the same mechanisms can be applied to 4G mobile or communication networks by replacing PCF by PCRF, SMF by PGW-C or TDF-C, and UPF by PGW-U or TDF-U.

Figure 3:
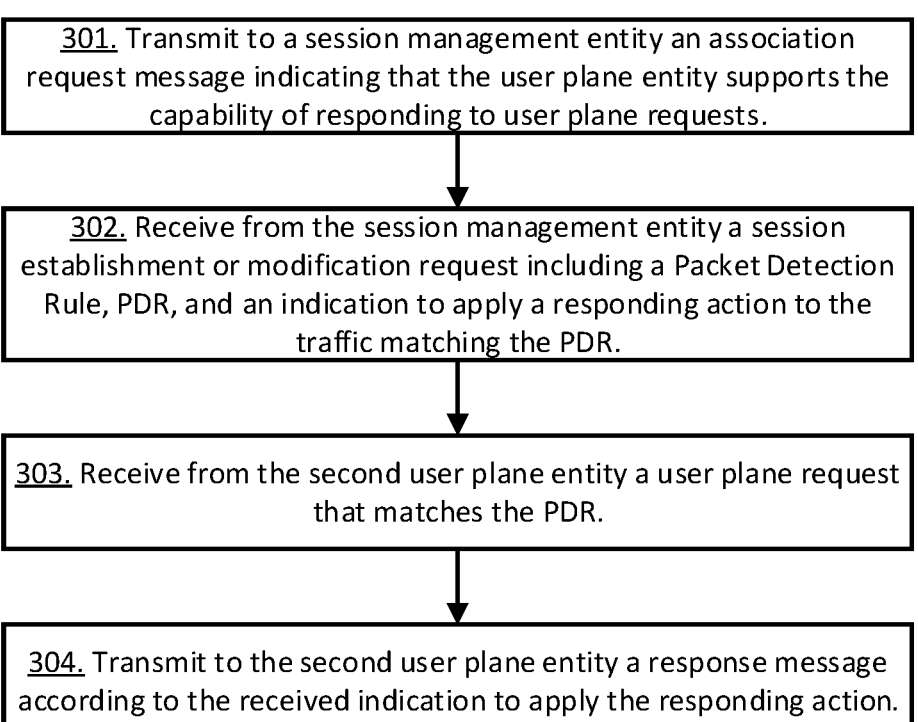
FIG. 3 is a flowchart illustrating a method performed by a mobile network node according to particular embodiments of the solution described herein.

FIG. 3 is a flowchart illustrating a method performed by a first user plane entity in a communications network for responding to user plane requests transmitted from a second user plane entity. The first user plane entity may be a UPF 103. The second user plane entity may be a UE 101 or an application server (AS) 201.

At step 301, the first user plane entity transmits to a session management entity an association request message indicating that the user plane entity supports the capability of responding to user plane requests.

At step 302, the first user plane entity receives from the session management entity a session establishment or modification request including a Packet Detection Rule, PDR, and an indication to apply a responding action to the traffic matching the PDR, wherein the indication comprises the network protocol to which the responding action applies to, and the information to be included in the response message.

At step 303, the first user plane entity receives from the second user plane entity a user plane request that matches the PDR.

At step 304, the first user plane entity transmits to the second user plane entity a response message according to the received indication to apply the responding action.

FIG. 4 is a flowchart illustrating a method performed by a session management entity in a communications network for configuring a user plane entity to respond to user plane requests transmitted from a second user plane entity. The session management entity may be a SMF 107.

At step 401, the session management entity receives from the user plane entity an association request message indicating that the user plane entity supports the capability of responding to user plane requests.

At step 402, the session management entity receives from a policy control entity a policy rule for an application identifier or a Packet Flow Descriptor including an indication to apply a responding action to the traffic of the application identifier or Packet Flow Descriptor.

At step 403, the session management entity selects the user plane entity based on the support of the capability of responding to user plane requests, in response to receiving from the policy control entity the policy rule including the indication to apply a responding action.

At step 404, the session management entity transmits to the user plane entity a session establishment or modification request including a Packet Detection Rule, PDR, according to the application identifier or Packet Flow Descriptor, and the indication to apply a responding action to the traffic matching the PDR.

Figure 5:
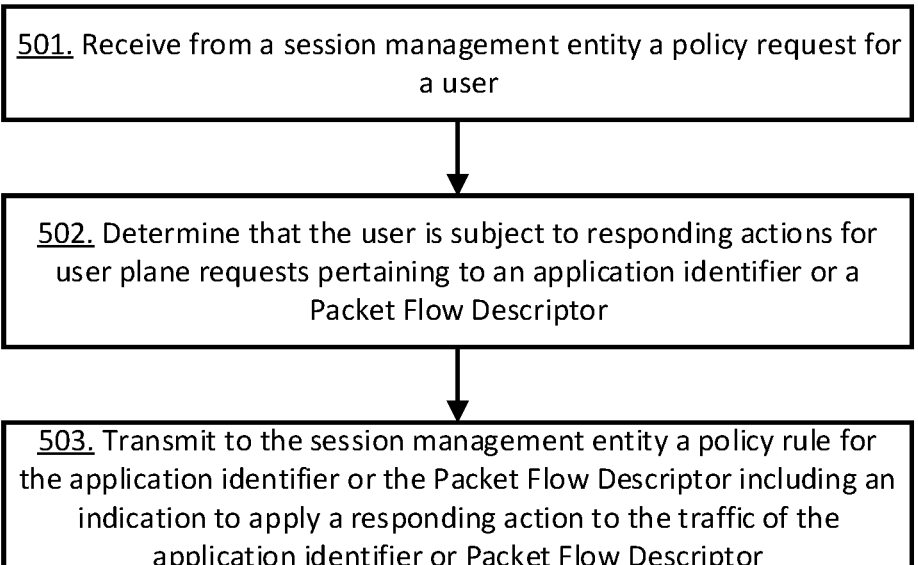
FIG. 5 is a flowchart illustrating a method performed by a mobile network node according to particular embodiments of the solution described herein.

FIG. 5 is a flowchart illustrating a method performed by a policy control entity in a communications network for providing policies related to responding actions to user plane requests. The policy control entity may be a PCF 111.

At step 501, the policy control entity receives from a session management entity a policy request for a user.

At step 502, the policy control entity determines that the user is subject to responding actions for user plane requests pertaining to an application identifier or a Packet Flow Descriptor.

At step 503, the policy control entity transmits to the session management entity a policy rule for the application identifier or the Packet Flow Descriptor including an indication to apply a responding action to the traffic of the application identifier or Packet Flow Descriptor.

Figure 6:
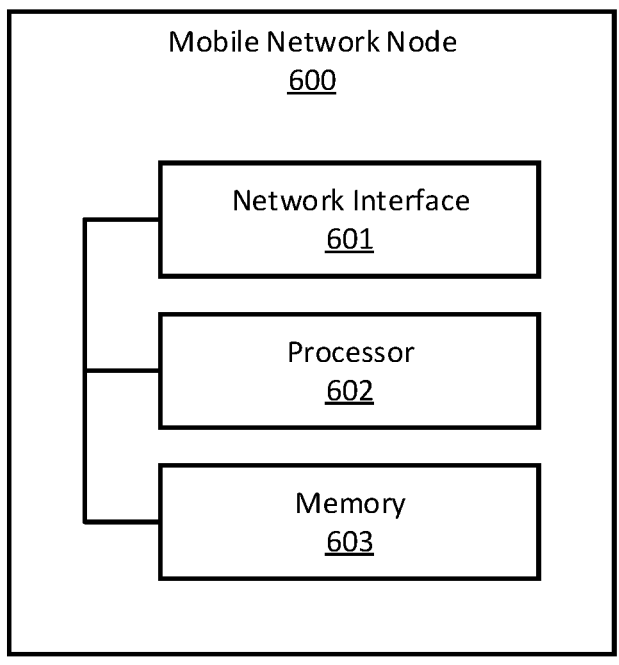
FIG. 6 is a block diagram of a mobile network node configured in accordance with particular embodiments of the solution described herein.

FIG. 6 is a block diagram illustrating elements of a mobile network node 600 of a mobile communications network. In some embodiments, the mobile network node 600 is a UPF 103.

As shown, the mobile network node may include network interface circuitry 601 (also referred to as a network interface) configured to provide communications with other nodes of the core network and/or the network. The mobile network node may also include a processing circuitry 602 (also referred to as a processor) coupled to the network interface circuitry, and memory circuitry 603 (also referred to as memory) coupled to the processing circuitry. The memory circuitry 603 may include computer readable program code that when executed by the processing circuitry 602 causes the processing circuitry to perform operations according to embodiments disclosed herein. According to other embodiments, processing circuitry 602 may be defined to include memory so that a separate memory circuitry is not required. As discussed herein, operations of the mobile network node may be performed by processing circuitry 602 and/or network interface circuitry 601. For example, processing circuitry 602 may control network interface circuitry 601 to transmit communications through network interface circuitry 601 to one or more other network nodes and/or to receive communications through network interface circuitry from one or more other network nodes. Moreover, modules may be stored in memory 603, and these modules may provide instructions so that when instructions of a module are executed by processing circuitry 602, processing circuitry 602 performs respective operations (e.g., operations discussed below with respect to Example Embodiments relating to core network nodes).

Figure 7:
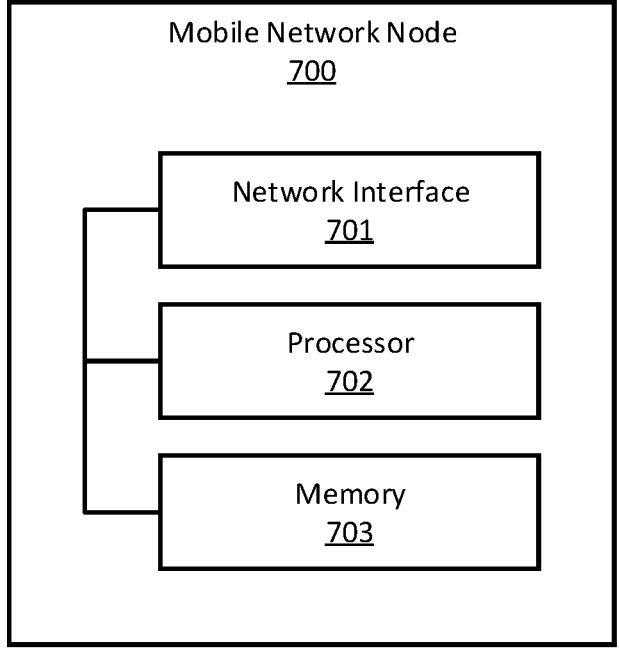
FIG. 7 is a block diagram of a mobile network node configured in accordance with particular embodiments of the solution described herein.

FIG. 7 is a block diagram illustrating elements of a mobile network node 700 of a mobile communications network. In some embodiments, the mobile network node 700 is a SMF 107. As shown, the mobile network node may include network interface circuitry 701 (also referred to as a network interface) configured to provide communications with other nodes of the core network and/or the network. The mobile network node may also include a processing circuitry 702 (also referred to as a processor) coupled to the network interface circuitry, and memory circuitry 703 (also referred to as memory) coupled to the processing circuitry. The memory circuitry 703 may include computer readable program code that when executed by the processing circuitry 702 causes the processing circuitry to perform operations according to embodiments disclosed herein. According to other embodiments, processing circuitry 702 may be defined to include memory so that a separate memory circuitry is not required. As discussed herein, operations of the mobile network node may be performed by processing circuitry 702 and/or network interface circuitry 701. For example, processing circuitry 702 may control network interface circuitry 701 to transmit communications through network interface circuitry 701 to one or more other network nodes and/or to receive communications through network interface circuitry from one or more other network nodes. Moreover, modules may be stored in memory 703, and these modules may provide instructions so that when instructions of a module are executed by processing circuitry 702, processing circuitry 702 performs respective operations (e.g., operations discussed below with respect to Example Embodiments relating to core network nodes).

Figure 8:
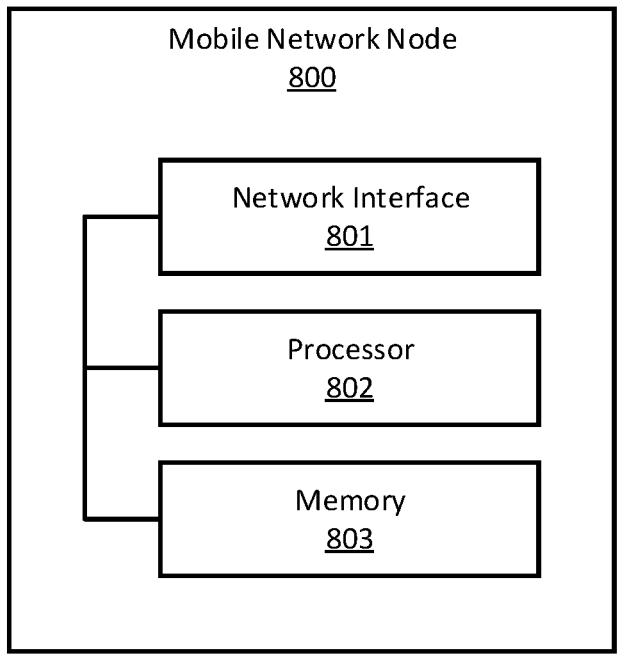
FIG. 8 is a block diagram of a mobile network node configured in accordance with particular embodiments of the solution described herein.

FIG. 8 is a block diagram illustrating elements of a mobile network node 800 of a mobile communications network. In some embodiments, the mobile network node 800 is a PCF 111. As shown, the mobile network node may include network interface circuitry 801 (also referred to as a network interface) configured to provide communications with other nodes of the core network and/or the network. The mobile network node may also include a processing circuitry 802 (also referred to as a processor) coupled to the network interface circuitry, and memory circuitry 803 (also referred to as memory) coupled to the processing circuitry. The memory circuitry 803 may include computer readable program code that when executed by the processing circuitry 802 causes the processing circuitry to perform operations according to embodiments disclosed herein. According to other embodiments, processing circuitry 802 may be defined to include memory so that a separate memory circuitry is not required. As discussed herein, operations of the mobile network node may be performed by processing circuitry 802 and/or network interface circuitry 801. For example, processing circuitry 802 may control network interface circuitry 801 to transmit communications through network interface circuitry 801 to one or more other network nodes and/or to receive communications through network interface circuitry from one or more other network nodes. Moreover, modules may be stored in memory 803, and these modules may provide instructions so that when instructions of a module are executed by processing circuitry 802, processing circuitry 802 performs respective operations (e.g., operations discussed below with respect to Example Embodiments relating to core network nodes).

The solution disclosed above concerns responding actions on a per subscriber, application, and PCC rule basis. In addition to this, responding actions may also apply on a per subscriber group and node basis, i.e. responding actions that apply to all the users within a subscriber/user group or all the users handled by or allocated to a certain network node. In this case the PCF shall determine what nodes or subscriber/ user groups are subject to the responding actions. To configure the responding actions on a per subscriber group or node basis, the PCF may transmit the corresponding policies to the SMF, e.g. via dynamic PCC rules, associating what responding actions are to be applied on a per node/user group basis. There may be as well a combination of responding actions on a per subscriber, application, and PCC rule basis and responding actions on a per subscriber group or node basis. For example, responding actions that apply to a specific application for the users allocated to a certain node that additionally belong to a certain user group.

The invention claimed is:

1. A method performed by a first user plane entity in a communications network for responding to user plane requests transmitted from a second user plane entity, the method comprising:

receiving from a session management entity a session establishment or modification request including a Packet Detection Rule, PDR, and an indication to apply a responding action to traffic matching the PDR, wherein the indication comprises a network protocol to which the responding action applies to, and the information to be included in a response message;

receiving from the second user plane entity a user plane request that matches the PDR;

generating, by the first user plane entity, the response message according to the received indication to apply the responding action; and transmitting the response message from the first user plane entity to the second user plane entity.

2. The method of claim 1, further comprising:

transmitting to a session management entity an association request message indicating that the user plane entity supports a capability of responding to user plane requests.

3. The method of claim 1, wherein the indicated network protocol is Domain Name System, DNS, the response message is a DNS response, and the information to be included in the response message comprises any one of an address of a destination server, an address of a redirect DNS server, a redirect Fully Qualified Domain Name, an indication that the Fully Qualified Domain Name in a DNS request does not exist or an indication that no data is to be provided in the response.

4. The method of claim 1, wherein the indicated network protocol is Hypertext Transfer Protocol, HTTP, the response message is an HTTP response, and the information to be included in the response message comprises an HTTP response code and at least one further parameter, particularly wherein the response code is a redirect response code and the at least one further parameter comprises the redirection URL.

5. The method of claim 1, wherein the indicated network protocol is Transmission Control Protocol, TCP, the response message is a TCP message, and the information to be included in the response message comprises TCP flags to be activated in the TCP header, wherein the TCP flags to be activated comprise the TCP RST flag, indicating to reset the TCP connection.

6. The method of claim 1, wherein the indicated network protocol is Transport Layer Security, TLS, the response message is a TLS message, and the information to be included in the response message comprises a type of TLS message, wherein the type of TLS message is a TLS error message to terminate a TLS handshake.

7. The method of claim 1, wherein the first user plane entity is a User Plane Function, UPF, the session management entity is a Session Management Function, SMF, and the second user plane entity is a User Equipment or an Application Server.

8. A method performed by a session management entity in a communications network for configuring a user plane entity to respond to user plane requests transmitted from a second user plane entity, the method comprising:

receiving from a policy control entity a policy rule for an application identifier or a Packet Flow Descriptor including an indication to apply a responding action to the traffic of the application identifier or Packet Flow Descriptor;

transmitting to the user plane entity a session establishment or modification request including a Packet Detection Rule, PDR, according to the application identifier or Packet Flow Descriptor, and the indication to apply a responding action to the traffic matching the PDR, the indication including the network protocol to which the responding action applies and the information to be used by the user plane entity to generate a response message.

9. The method of claim 8, further comprising:

receiving from the user plane entity an association request message indicating that the user plane entity supports the capability of responding to user plane requests;

selecting the user plane entity based on the support of the capability of responding to user plane requests, in response to receiving from the policy control entity the policy rule including the indication to apply a responding action.

10. The method of claim 8, wherein the indicated network protocol is Domain Name System, DNS, the response message is a DNS response, and the information to be included in the response message comprises any one of an address of a destination server, an address of a redirect DNS server, a redirect Fully Qualified Domain Name, an indication that the Fully Qualified Domain Name in the DNS request does not exist or an indication that no data is to be provided in the response.

11. The method of claim 8, wherein the indicated network protocol is Hypertext Transfer Protocol, HTTP, the response message is an HTTP response, and the information to be included in the response message comprises the HTTP response code and at least one further parameter, particularly wherein the response code is a redirect response code and the at least one further parameter comprises the redirection URL.

12. The method of claim 8, wherein the indicated network protocol is Transmission Control Protocol, TCP, the response message is a TCP message, and the information to be included in the response message comprises TCP flags to be activated in the TCP header, particularly wherein the TCP flags to be activated comprise a TCP RST flag, indicating to reset a TCP connection.

13. The method of claim 8, wherein the indicated network protocol is Transport Layer Security, TLS, the response message is a TLS message, and the information to be included in the response message comprises a type of TLS message, wherein the type of TLS message is a TLS error message to terminate a TLS handshake.

14. The method of claim 8, wherein the user plane entity is a User Plane Function, UPF, the session management entity is a Session Management Function, SMF, and the policy control entity is a Policy Control Function, PCF.

15. A method performed by a policy control entity in a communications network for providing policies related to responding actions to user plane requests, the method comprising:

receiving from a session management entity a policy request for a user;

determining that the user is subject to responding actions for user plane requests pertaining to an application identifier or a Packet Flow Descriptor;

transmitting to the session management entity a policy rule for the application identifier or the Packet Flow Descriptor including an indication to apply a responding action to the traffic of the application identifier or Packet Flow Descriptor, the indication including the network protocol to which the responding action applies and the information to be used by the user plane entity to generate a response message.

16. The method of claim 15, wherein the determining step comprises retrieving from a user data repository the subscription data for the user, wherein the subscription data comprises an indication to apply a responding action to the traffic of the application identifier or the Packet Flow Descriptor.

17. The method of claim 15, wherein the indicated network protocol is Domain Name System, DNS, the response message is a DNS response, and the information to be included in the response message comprises any one of an address of a destination server, an address of a redirect DNS server, a redirect Fully Qualified Domain Name, an indication that the Fully Qualified Domain Name in the DNS request does not exist or an indication that no data is to be provided in the response.

18. The method of claim 15, wherein the indicated network protocol is Hypertext Transfer Protocol, HTTP, the response message is an HTTP response, and the information to be included in the response message comprises the HTTP response code and at least one further parameter, particularly wherein the response code is a redirect response code and the at least one further parameter comprises the redirection URL.

19. The method of claim 15, wherein the indicated network protocol is Transmission Control Protocol, TCP, the response message is a TCP message, and the information to be included in the response message comprises TCP flags to be activated in the TCP header, particularly wherein the TCP flags to be activated comprise a TCP RST flag, indicating to reset a TCP connection.

20. A user plane entity for responding to user plane requests transmitted from a second user plane entity in a communications network, the user plane entity comprising a processor and a memory, the memory containing instructions executable by the processor such that the user plane entity is operable to:

receive from the session management entity a session establishment or modification request including a Packet Detection Rule, PDR, and an indication to apply a responding action to the traffic matching the PDR, wherein the indication comprises the network protocol to which the responding action applies to, and the information to be included in the response message;

receive from the second user plane entity a user plane request that matches the PDR;

generate, by the first user plane entity, a response message according to the received indication to apply the responding action; and transmit the response message from the first user plane entity to the second user plane entity.

* * * * *